United States Patent [19]
Evalds

[11] 3,730,819
[45] May 1, 1973

[54] TEMPERATURE CONTROL APPARATUS EMPLOYING HEATING AND COOLING CONTROL CIRCUITS ARRANGED IN A HEAD TO TOE CONFIGURATION

[75] Inventor: Egils Evalds, Ardmore, Pa.

[73] Assignee: Athena Controls, Inc., West Conshohocken, Pa.

[22] Filed: Oct. 18, 1971

[21] Appl. No.: 189,881

[52] U.S. Cl.....................................165/26, 165/30
[51] Int. Cl..............................................F25b 29/00
[58] Field of Search......................165/26, 27, 30, 12

[56] References Cited

UNITED STATES PATENTS 3,677,335    7/1972    Weathouston .........................165/12

*Primary Examiner*—Charles Sukalo
*Attorney*—William E. Cleaver

[57] ABSTRACT

The present system is a time proportional system for controlling both heat and cooling. The present system provides a plurality of stages of individual heating control circuits and a plurality of stages of individual cooling control circuits. The system in general follows a last on-first off procedure. The ascending stages of the heating series are respectively circuitry connected to the descending stages of the cooling series, i.e., the first stage of the heating series is connected to the last stage of the cooling series and vice versa so that when a heating stage is turned on it will cause the cooling stage to which it is connected to be turned off and vice versa. Because of the head to toe arrangement the present system can employ both heating and cooling stages simultaneously when the conditions warrant such an arrangement.

8 Claims, 1 Drawing Figure

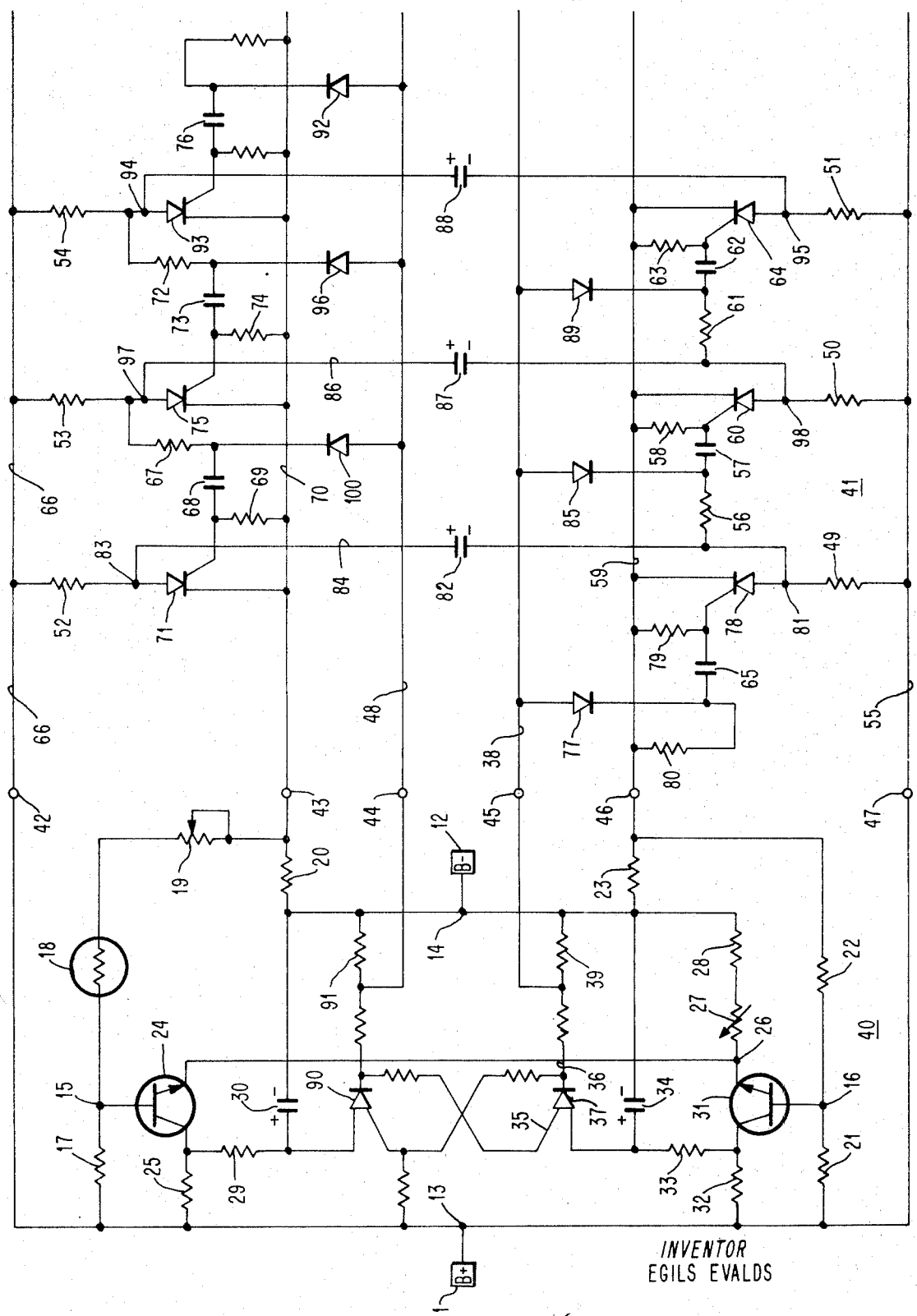

TEMPERATURE CONTROL APPARATUS EMPLOYING HEATING AND COOLING CONTROL CIRCUITS ARRANGED IN A HEAD TO TOE CONFIGURATION

DESCRIPTION

The present invention relates to a temperature control system and in particular to a system which time-proportionately controls both heating and cooling of a large volume of air or controls a system which requires an overlap of heating and cooling efforts.

When a heating or cooling effort is effected by electrical power it is very often desirable to accomplish such an effort by incrementally adding hot air and alternatively cooled air. It has become the procedure to employ a mechanical stepping switch which is "stepped up" to "cut in" certain heating elements or certain cooling elements and "stepped down" to "cut out" certain heating elements or certain cooling elements. The mechanical stepping procedure is satisfactory to a point but has certain limitations which are overcome by the present invention. The stepper system employs a mechanical device which involves moving parts and therefore is burdened by the wear involved therewith. In addition, the stepper device does not lend itself to a vernier control because the steps act to "cut in" or "cut out" a given amount of heat (or cold) each time they are advanced or returned. Hence, cycling for a small difference of temperature is not readily accomplished without temperature overshoot when the stepper system is employed. Further, if the device of the temperature control is a large room or series of rooms such as in a super market or the like, and there is a single control system employed for both heating and cooling it is very difficult to interconnect stepping switches to effect a control of one stepper by another so that, for instance, the humidity control of the cooling system can be taken advantage of when in fact the system is attempting to warm the room.

SUMMARY

The present system comprises a plurality of stages of heating control circuits and a plurality of stages of cooling control circuits so connected that the first heating control stage to be turned on in response to a signal to add heat is connected to the last cooling control stage to be turned on and the next heat control stage in ascending order is connected to the next succeeding descending cooling control stage so that finally the first cooling control stage to be turned on is connected to the last heating control stage to be turned on. As will become apparent in the description that follows, the above described head-to-toe arrangement enables the present system to effectively employ both heating and cooling efforts simultaneously so that the humidity control of the cooling device can be used when the system is demanding heat and further so that the system can effect a cycling procedure in response to a very small change in temperature, in addition to being able to effect a normal heating and cooling effort. The pulse generator portion of the circuit in conjunction with the head-to-toe arrangement enable the circuit to perform a vernier operation.

The features and objects of the present invention will become apparent in accordance with the description to follow taken in conjunction with the drawing.

In the FIGURE there is shown a source of electrical power 11 and 12 represented by the well understood symbols B+ and B−. The source 11 and 12, as depicted in the circuit shown in the FIGURE, is a direct current source of electrical power. Connected across the source of electrical power 11 and 12 is a bridge circuit. The bridge circuit has input terminals 13 and 14 and output terminals 15 and 16. Upon examination of the FIGURE it can be seen that one leg of the bridge is represented by the resistor 17, a second leg of the bridge is represented by the serial connection of the thermistor 18, the set point resistor 19 and the fixed resistor 20. Also upon inspection of the FIGURE it can be seen that the third leg of the bridge is represented by the resistor 21, while a fourth leg of the bridge is represented by the serial connection of the fixed resistor 22 and the fixed resistor 23. Accordingly, when the system is in operation and power is supplied to the terminals 13 and 14 there is current flow from the terminal 13, through the resistor 17, through the resistors 18, 19 and 20 to the terminal 14 as well as current flow through the resistor 21, through the resistors 22 and 23 to the terminal 14.

The set point resistor 19 is the element which permits the user to determine or set the temperature about which the system will operate. Assume for a given setting of the set point resistor 19 that the thermistor 18 is cold. In other words, the temperature of the item which the thermistor is monitoring is colder than the temperature value to which the set point resistor 19 has been set. If the thermistor 18 is cold, its resistance is high and there is a relatively limited current passing through the resistor 17, thermistor 18 and resistors 19 and 20. Hence there is a relatively small voltage drop across the resistor 17. With the relatively small voltage drop across the resistor 17, the terminal 15 is at a relatively high voltage and hence the transistor 24 is conditioned to conduct. If the transistor conducts, there will be current flow from the terminal 13, through the resistor 25, through the transistor 24, to the terminal 26, through the variable resistor 27, through the resistor 28, to the terminal 14. If the transistor 24 is conducting fully (i.e., has been completely turned on) there will be virtually no current flow through the resistor 29 to charge up the capacitor 30.

It can be determined from the FIGURE in view of the foregoing description, that the voltage at point 26 will be virtually the same as the voltage on the collector of transistor 24 and hence the transistor 31 will not be forward-biased for conduction. Since the transistor 31 is not conducting, current will flow through the resistors 32 and 33 to charge up the capacitor 34. When the capacitor 34 has been charged up to a certain percentage of the voltage which appears across the control element 35 and the cathode 36 of the program unijunction transistor 37, this unijunction transistor 37 will conduct. The required voltage to "fire" the program unijunction transistor 37 can vary and in the preferred embodiment it is 75 percent.

When the unijunction transistor 37 conducts, the capacitor 34 discharges therethrough providing a sharp positive pulse on the add heat line 38 in response to the voltage developed across the resistor 39. Upon completion of the discharge of the capacitor 34, the program unijunction transistor 37 terminates its conduction and once again the capacitor 34 commences to build up the charge thereon. When the proper percentage of voltage is developed across the capacitor 34 to "fire" the program unijunction transistor 37, the unijunction transistor will "fire" once again providing a second positive pulse on the add heat line 38. The resistor 33 and the capacitor 34 provide the RC time constant for firing the program unijunction transistor. In other words, the period of time between "cutting in" or adding the increments of heat is determined by the RC time constant developed by the resistor 33 and the capacitor 34.

Before considering the response of the system to the positive pulses on the add heat line 38, it should be noted that the power circuit 40 is connected to the control circuit 41 by six terminals 42 through 47. The terminal 42 connects the positive side of the power supply to the cooling stages, while the positive side of the power supply is connected to the heating stages through the terminal 47. The cooling stages of the circuit are connected through terminal 43 to the negative side of the power supply while the heating stages are connected through terminal 46 to the negative side of the power supply. The add cooling line 48 is connected through the terminal 44 to the bridge circuit while the add heat line 38 is connected through the terminal 45 to the bridge circuit.

Further before considering the effect of positive pulses appearing on line 38, consider the structure of the heating and cooling stages. The resistors 49, 50 and 51 represent the load elements of the heater stages. In other words, the resistors 49, 50, 51 represent either the heaters themselves, as the case in the small systems, or relays (or some other type switch) through which the heaters are activated to actually generate heat. The resistors 52, 53 and 54 are the load resistors of the cooling circuits. These last mentioned load resistors represent the relays which turn on the cooling compressors and activate the devices which actually add cool air to the room or item to be cooled.

Assume that none of the heating devices has been turned on and none of the cooling devices has been turned on and that the system is initially starting up. Under these circumstances current will flow from terminal 13, along line 55, through resistor 49, through resistor 56, through capacitor 57 (which is becoming charged), through the resistor 58, to line 59 across the resistor 23 to terminal 14. The combined resistance of the resistors 49, 56, and 58 is sufficiently high to limit current flow so that the silicon controlled rectifier 60 does not get turned on when the capacitor 57 is being charged up. At the same time there is current flow from the terminal 13, along line 55, through the resistor 50, through the resistor 61, through the capacitor 62 (which is being charged), through the resistor 63, to line 59, across the resistor 23 to the terminal 14. In a similar manner, the resistors 50, 61 and 63 are of sufficiently high resistance to limit the current flow so that in the course of charging up the capacitor 62 the silicon controlled rectifier 64 does not get turned on. It should be noted that on the heating side, the capacitor 65 is not charged in response to this initial turn-on activity.

At the same time there will be current flow from the terminal 13, along the line 66, through the resistor 53, through the resistor 67, through the capacitor 68 (which is being charged at this time), through the resistor 69, to line 70, across resistor 20, to the terminal 14. The resistors 53, 67 and 69 are sufficiently high to limit the current flow thereacross so that the silicon controlled rectifier 71 is not turned on when the capacitor 68 is being charged. At the same time there is current flow from the terminal 13, along the line 66, through the resistor 54, through the resistor 72, through the capacitor 73 (which is being charged at this time), through the resistor 74 to line 70, through the resistor 20 to the terminal 14. As was true with the other circuit arrangements, the resistors 54, 72 and 74 are of sufficiently high resistance, to limit the current flow so that the silicon controlled rectifier 75 is not turned on when the capacitor 73 is being charged. It should be noted that the capacitor 76 is not charged up in response to this initial turn-on activity.

Reconsider now that the thermistor 18 is colder than the value set on the resistor 19 so that there is a positive pulse applied to the add heat line 38 as was described earlier in response to the discharge of the capacitor 34. When a positive pulse appears on the add heat line 38 there is current flow through the diode 77 to charge the capacitors 65. As was explained above, the capacitor 65 prior to this time had been discharged and hence it passes the positive pulse to provide a positive bias to the silicon controlled rectifier 78. Accordingly the silicon controlled rectifier 78 conducts. At the same time the capacitor 65 is charged by the current flow through the resistor 79 but discharges when the positive pulse on line 38 subsides. It should also be noted that when the silicon controlled rectifier 78 conducts there is current flow from terminal 13, along the line 66, through the resistor 52, along the line 84 to charge the capacitor 82 as shown by the polarity symbols thereon. At the same time it should also be noted that the capacitor 57 discharges through the resistor 56, through the conducting silicon controlled rectifier 78, through the resistor 58 to the other side of the capacitor 57. Hence, the capacitor 57 is in a discharged state and is able to respond to the next positive pulse on line 38. If we assume that thermistor 18 remains colder than the value set on the resistor 19 then the capacitor 34 will have a chance to charge up a second time and fire the unijunction transistor 37 so that a second positive pulse will be generated on line 38. The second positive pulse on line 38 is transmitted through the diode 85, through the capacitor 57, to turn on the silicon controlled rectifier 60. When the silicon controlled rectifier 60 is turned on, there is current flow from the terminal 13, along the line 66, through the resistor 53, along the line 86, to charge up the capacitor 87, in accordance with the polarity symbols shown thereon. At the same time the capacitor 62 is discharged through the resistor 61, through the conducting silicon controlled rectifier 60, through the resistor 63 to the other side of the capacitor 62. As was discussed earlier in connection with the capacitor 65, the capacitor 57 will be discharged after the second positive pulse disappears. The next positive pulse will be passed through the capacitor 57 but will have no effect on the silicon controlled rectifier 60 because that silicon controlled rectifier is already conducting. The method by which the last stage silicon controlled rectifier 64 is turned on is similar to the method just described and no further description thereof appears to be necessary.

It must be remembered that when the silicon controlled rectifier 78 was turned on, current flowed through the resistor 49. The current flowing through the resistor 49 (which in this case will be assumed to be the winding of a relay) caused a relay to be energized which turned on the first heat generating device, represented by, or associated with, the first stage heating control circuit. Similarly when the silicon controlled rectifier 60 was turned on, a second stage of heat was turned on and thus two heating sources were generating heat for the device to be temperature controlled. Similarly, when the third stage silicon controlled rectifier 64 is turned on, a third stage or third heat generating device is turned on, represented by the resistor 51.

Consider now that the thermistor 18 has become sufficiently warm so that the current therethrough has been limited and hence the transistor 24 is no longer conducting or is conducting very little. Accordingly, the point 16 becomes positive with regard to the terminal 26 and hence the transistor 31 commences to conduct heavily. Under these circumstances there would be current flow through the resistor 25 and resistor 29 to charge up the capacitor 30 and when a sufficient amount of charge has been developed across the capacitor 30, the unijunction transistor 90 conducts to provide a positive signal on the line 48 in accordance with the voltage developed across the resistor 91. When this add cold pulse is generated on line 48 it is transmitted through the diode 92, through the capacitor 76, to turn on the silicon controlled rectifier 93. It should be noted that the first stage of the cooling control series is at the opposite end of the chain from the first stage of the heating control series. When the silicon controlled rectifier 93 conducts, the terminal 94 becomes negative and hence the potential developed across the capacitor 88 (as shown in the FIGURE) is measured from a negative potential thus making the terminal 95 become very negative thereby turning off the silicon controlled rectifier 64. It should be apparent then that when the first stage of the cooling element gets turned on its acts to turn off the last stage of the heating element if in fact that last stage is conducting. It should also be apparent that the capacitor 88 will charge up in the direction opposite from the polarity shown in the FIGURE. The capacitor 76 will not remain charged once the positive pulse has disappeared and any further positive pulses will have no effect so long as the silicon controlled rectifier 93 is conducting. It should also be noted that when the silicon controlled rectifier 93 conducts the capacitor 73 discharges therethrough, thereby putting that capacitor in a state to respond to the next positive signal on line 48. If we assume that the thermistor 18 has not cooled off sufficiently and that therefore the transistor 31 continues to conduct, then the capacitor 30 will charge up a second time and fire the program unijunction transistor 90 a second time thereby providing a second positive pulse on line 48. The second positive pulse on line 48 will be transmitted through the diode 96, through the capacitor 73, to turn on the silicon controlled rectifier 75. When the silicon controlled rectifier 75 conducts, the terminal 97 goes negative and hence the charge across the capacitor 87 is measured from a negative potential, causing the terminal 98 to go very negative thereby turning off the silicon controlled rectifier 60. Accordingly it becomes apparent that when the second stage of the cooling series is turned on it acts to turn off the second stage heating circuit provided that last mentioned circuit has been conducting. At the same time the capacitor 87 charges up in a direction opposite from that shown in the drawing. It should be remembered that during the turning on of the first and second stages of the cooling system that the resistors 54 and 53 which are the load resistors can act to energize relays which in turn can activate compressors and fans to pump cool air into the room or device being temperature monitored. The turning on of the last stage silicon controlled rectifier 71 is similar to those previously described and its turning on acts to turn off the first stage of the heating control circuits if that stage has been conducting. Capacitor 82 charges up in the opposite direction from that shown in the FIGURE.

It can be determined by examining the circuit that as each heating stage is turned off, the associated control capacitor which links it to the next stage becomes charged so that the last stage turned off would be the first stage turned on, if the system should again generate a positive pulse on line 38. For instance, when the silicon controlled rectifiers 64 and 60 have been turned off the capacitor 62 will be charged up thereby preventing the silicon controlled rectifier 64 from turning on in response to the generation of a positive pulse on line 38. However, the capacitor 57 would not be charged up since the silicon controlled rectifier 58 is still conducting. Hence, if after the time that the silicon controlled rectifiers 64 and 60 were turned off, a positive signal appeared on line 38 the capacitor 57 would respond to that signal to turn on the silicon controlled rectifier 60. It should be apparent that the system follows the pattern that the last stage turned off is the first stage turned on. An examination of the cooling control stages will reveal that the last stage turned off is the first stage turned on.

With respect to the utility of the present control circuit arrangement consider the following. If the system is controlling the heating and cooling of a large room such as a supermarket or church auditorium or the like, the comfort of the shoppers, parishioners or the like is the prime consideration. If only heat is needed the system incrementally adds heat and the electrical system is not overburdened. If only cooling is needed, the system incrementally adds cold air and the electrical system is not overburdened. However, on many occasions heat is supplied and with the addition of the body heat of either the shoppers or the parishioners or the like, the temperature and the relative humidity of the "room" increases. In many systems the only solution to this problem is to turn off the heat until the temperature decreases by some "natural" process. Such a solution takes a long time and under such circumstances the relative humidity makes the temperature of the room most uncomfortable, until the comfort index is arrived at. In the present system when the heat exceeds the value set on resistor 19 the resistance of the thermistor 18 decreases to a point where there is a positive pulse generated on line 48. This add-cool air signal (positive pulse) serves to turn on the silicon controlled rectifier 93 as just described and hence the load resistor 54 would be energized and thereby picking up a relay cutting in a first compressor to add cool air to the room being monitored. This last action accomplishes two things. The temperature of the room is positively reduced rather than waiting for a "natural" cooling process, and at the same time the humidity is also reduced. The alternative as mentioned above is to permit the room to cool off "naturally" and add a de-humidifier which means the addition of equipment at some obvious increased cost. While it may seem an inefficient operation to be getting cool air at the same time that the system is adding hot air, the system is effective with this procedure in the sense that the shopper's comfort or parishioners' comfort (with respect to temperature and humidity) is attained in a very short time. In short, the present system makes use of the already existing cooling system to immediately control the temperature and humidity and the cooling system is an already existing necessary part of the overall system for controlling the temperature in the summer months. If in fact in this first hypothetical situation the temperature remains warm despite the emission of the cool air from the first cooling stage, a second pulse is generated on line 48 and a second cooling device through resistor 83 would be "cut in" to add additional cooled air and to reduce the humidity of the room. If this additional cool air should reduce the temperature of the room and hence the temperature of the thermistor 18 to a value below the value set on the resistor 19 then an additional add heat signal (positive pulse on line 38) would be generated to once again turn on the silicon controlled rectifier 60.

It should be clearly understood that while there are shown but three stages of heating and but three stages of cooling, the system could obviously have many stages depending upon the amount of cooling and heating to be used. This particular system is very useful in heating large rooms such as supermarkets, church auditoriums, athletic field houses, and things of this kind, because of the heating and cooling which take place throughout the summer and winter months and because the equipment can be effectively used to control humidity as well as temperature at any season of the year.

Another feature of the present invention is the vernier control of the system. As mentioned earlier, if a stepper is used and heat is required, a heating unit gets turned on with very little opportunity to have it overlap with a cooling unit. If we consider for the moment that a supermarket or a church auditorium represents a large mass of air to be heated or cooled or to be simply kept at a comfortable temperature then it becomes apparent that this mass of air cannot be changed rapidly with respect to its temperature-humidity combination (often referred to as the comfort index). Assume for a second hypothetical that the air in the supermarket is at about the proper temperature and humidity for the shoppers' comfort. Further assume that the system continually adds 15 percent fresh air from the atmosphere which surrounds the building and in this particular situation the air being added is cold and damp. Under these circumstances, the fresh air being brought in is adding a disproportionate amount of humidity and cold temperature. Accordingly, this air should be warmed and should be partially dried out. If nothing is done except to pass the air through a heating system then the incoming air will continually add humidity so that the room will soon become uncomfortable. On the other hand, if the air is dried out by circulating it continually through the cooling system then the air in the supermarket is apt to be cooled off below a desirable level. The optimum would be to have the air moderately warmed and moderately dried out and to have the system "cycle" its heating and cooling system to accomplish this warming and drying of the incoming air. If in this second hypothetical the situation is such that the room needs the first two stages of heat turned on in order to keep the room warm against the ambient temperature (the temperature outside of the building) then the system will simply cycle the third heating stage and the first cooling stage to effectively warm the incoming air and to dry the incoming air.

It will be noted that when the silicon controlled rectifiers 78 and 60 are conducting, the voltage across the resistor 23 is increased so that the terminal 46 is at a higher voltage value than it would be under the circumstances when the silicon controlled rectifiers 78 and 60 are not conducting. Accordingly, the voltage at point 16 is at a relatively high value and hence the transistor 31 is conducting to some degree. With transistor 31 conducting and depending upon the degree of its conduction it will take more time for the capacitor 34 to charge up than when transistor 31 is not conducting. Hence it will take more time to produce an additional pulse on line 38. In this regard, the system is anticipatory. That is to say the system is anticipating that there will be less heat required and is slowing down the period of the pulses to a great measure. The anticipatory feature is on the cooling side also and is effected through the resistor 20.

In our second hypothetical we have determined that it would be desirable to turn on the silicon controlled rectifier 64 for a short period of time and thereafter turn on the silicon controlled rectifier 93 for a short period of time, thereby effecting a warming of the added air and also a drying out of the added air. If the temperature of the room is at a temperature which is comfortable then the temperature of thermistor 18 should theoretically be at the value set on the set resistor 19. Accordingly, both the transistors 24 and 31 should be conducting so that there will be no pulses created on either lines 48 or 38. However, under this second hypothetical we have decided that we do want the silicon controlled rectifier 64 to conduct for a short period of time and the silicon controlled rectifier 93 to conduct for a short period of time. The way this is accomplished is by adjusting the resistor 27. If the resistance of the resistor 27 is increased then the voltage at the point 26 is increased and hence the conduction through transistors 31 and 24 is reduced thereby providing some current to charge up, respectively, to capacitors 34 and 30. The period of their charge up can be adjusted through the variable resistor 27. Hence we can take the system when it is at a balanced bridge condition and adjust it so that it will cycle the last stage of the heating system and the first stage of the cooling system. It should be apparent that if the transistors 31 and 24 are caused to conduct less by the adjustment of the resistor 27 then periodically there will be pulses generated on line 38 and on line 48, to turn on the last stage of the heating system and to also turn on the first stage of the cooling system. Because the first two stages of the heating system are conducting and the voltage at point 46 is increased the adjustment of the resistor 27 will not create an even period with respect to charging up the capacitors 34 and 30. In other words, it would appear that it would take longer under the circumstances for the capacitor 34 to become fully charged than it would take for the capacitor 30 to become fully charged. However, the system takes this into account because as soon as the first stage of the cooling series gets turned on the voltage at point 43 increases which in turn causes the transistor 24 to conduct harder and reduces the current to charge up of the capacitor 30 (and therefore lengthens the period). The user can adjust the resistor 27 until the cycling time appears to be the proper cycling time for any given set of circumstances outside of the building and in view of the fresh air being added to the system. This cycling adjustment is a "fire" adjustment and accordingly is termed a vernier adjustment.

In many applications I have found that it is preferable to cycle units which are one stage apart. This condition gives an actual overlap of cool air and hot air being added at the same time and provides a very comfortable condition in the room. In order to accomplish cycling one unit apart, and only by way of example, I employed the resistor 53 as strictly a load resistor, i.e., current passing therethrough would not activate a compressor. In a similar fashion I would employ the resistor 51 as strictly a load resistor, i.e., current passing therethrough would not activate a heating unit. Under these circumstances, it can be readily understood that if the room was at the proper temperature with the first two stages of heating units turned on, i.e., resistors 49 and 50 having current therethrough and if the 15 percent fresh air was providing an uncomfortable amount of humidity and add-cold signal would be generated to turn on load 54. Hence, one cooling unit would be "cut in." However, no heating unit was cut out. Therefore, the cooling unit acts to reduce the humidity while the heating units continue to heat the air. Now as the temperature starts to cool with load 54 operating an add-heat signal will be generated to turn on load 51 which simply turns off the compressor associated with load 54 but does not add any heat so that there is no heating "over-ride."

On the other hand if the compressor associated with load 54 was not sufficiently cooling the room a second add-cold signal would activate load 53. This action would merely turn off the heater associated with load 50 but not add any cooling effort.

Accordingly small temperature and humidity "swings" can be maintained by cycling between unassociated units with employing the dummy loads, i.e., simply resistance loads. Now it should be understood that additional stages of this type of cycling can be employed and different arrangements of the dummy loads can be employed.

I claim:

1. A temperature control system employing N stages of heating units and N stages of cooling units comprising in combination: a source of electrical power; temperature responsive circuit means; add-heat signal generating means connected to said temperature responsive circuit means to produce add-heat signals in response to predetermined temperature conditions; add-cold signal generating means connected to said temperature responsive circuit means to produce add-cold signals in response to predetermined temperature conditions; N heating stages arranged in ascending order, with respect to said temperature responsive circuit means, from the first stage through the Nth stage, each heating unit stage, excepting the first stage, formed to be turned on in response to the coincidence of an add-heat signal applied thereto and the presence of its preceding heating unit stage being turned on, said first stage heating unit formed to be turned on in response to an add-heat signal only; N cooling unit stages arranged in descending order, with respect to said temperature responsive circuit means, from the Nth stage through the first stage, each cooling unit stage, excepting the first stage, formed to be turned on in response to the coincidence of an add-cool signal applied thereto and the presence of its preceding cooling unit stage being turned on, said first stage cooling unit formed to be turned on in response to an add-cool signal only; first circuitry means connecting said N stages of heating units to said add-heat signal generating means; second circuitry means connecting said N stages of cooling units to said add-cool signal generating means; and third circuitry means respectively connecting each cooling unit stage in descending order to a heating unit stage in ascending order so that the Nth stage cooling unit is connected to the first stage heating unit and so that the first stage cooling unit is connected to the Nth stage heating unit, said third circuitry means formed to cause a heating unit stage to be turned off when the cooling stage connected thereto is turned on and alternatively to cause a cooling unit stage to be turned off when the heating unit stage connected thereto is turned off.

2. A temperature control system according to claim 1 wherein said temperature responsive circuit means is a bridge circuit having a thermistor connected in one leg thereof.

3. A temperature control system according to claim 1 wherein said temperature responsive circuit means has first and second input terminals and first and second output terminals and wherein said add signal generating means comprises a transistor having an input element, an output element and a control element, said input element connected to said first input terminal, said output element is fourth circuitry connected to said second input terminal, and said control element connected to said first output terminal and further wherein said add signal generating means includes a capacitor connected between said input element of said last mentioned transistor and said second input terminal, and wherein said add signal generating means further include a current switching means connected to discharge said last mentioned capacitor in response to a predetermined voltage developed thereacross whereby an add signal is generated each time said last mentioned capacitor is charged.

4. A temperature control system according to claim 1 wherein said temperature responsive circuit means has first and second input terminals and first and second output terminals and wherein said subtract signal generating means includes a transistor having an input element, an output element, and a control element and wherein said input element is connected to said first input terminal, said output element is fourth circuitry connected to said second input, said control element is connected to said first output terminal, and further wherein said subtract signal generating means includes a capacitor connected between said input element of said last mentioned transistor and said second input terminal, wherein there is further included a current switching means connected to discharge said last mentioned capacitor in response to a predetermined voltage developed thereacross whereby a subtract signal is generated each time said last mentioned capacitor discharges.

5. A temperature control system according to claim 4 wherein said current switching means is a program unijunction transistor and wherein there is further included cross coupling circuitry between said last mentioned program unijunction transistor and said add signal generating means to prevent said last mentioned program unijunction transistor and said add signal generating means from turning on at the same time.

6. A temperature control system according to claim 2 wherein there is further included in said bridge circuit means a variable resistor whose different resistance values are equated to different temperature values and whose setting determines the relationship between the desired temperature about which the system operates and the voltages developed at the output means of said bridge circuit.

7. A temperature control circuit according to claim 1 wherein said add signal generating means and said subtract signal generating means are common connected through variable resistance means whereby the current through said add signal generating means and said subtract signal generating means can be varied to generate add and subtract pulses at a different rate in accordance with said variable resistance setting.

8. A temperature control system according to claim 1 wherein certain of said heating unit stages are formed to be simply an electrical load and not provide heat and wherein certain of said cooling unit stages are formed to be simply an electrical load and not provide cooling.

* * * * *